United States Patent [19]
Oezelli et al.

[11] Patent Number: 4,735,830
[45] Date of Patent: Apr. 5, 1988

[54] GLASS PRIMER

[75] Inventors: Riza N. Oezelli, Neuss; Hans-Josef Hoffman, Kempen; Hans-Peter Kohlstadt, Velbert, all of Fed. Rep. of Germany

[73] Assignee: Henkel Kommanditgesellschaft auf Aktien, Duesseldorf, Fed. Rep. of Germany

[21] Appl. No.: 12,101

[22] Filed: Feb. 6, 1987

Related U.S. Application Data

[62] Division of Ser. No. 689,619, Jan. 8, 1986, Pat. No. 4,670,057.

[30] Foreign Application Priority Data

Jan. 12, 1984 [DE] Fed. Rep. of Germany ....... 3400860

[51] Int. Cl.$^4$ ................ B05D 3/02; C08L 83/00
[52] U.S. Cl. ................ 427/407.2; 106/236; 106/238; 428/428; 428/447

[58] Field of Search ............... 106/236; 428/428, 447; 427/407.2

[56] References Cited

U.S. PATENT DOCUMENTS

| 3,837,876 | 9/1974 | Mayuzumi et al. | 106/287.13 |
| 3,955,036 | 5/1976 | Plueddemann | 428/436 |
| 4,345,004 | 8/1982 | Miyata et al. | 428/416 |
| 4,670,057 | 6/1987 | Oezelli et al. | 106/238 |

Primary Examiner—Theodore Morris
Attorney, Agent, or Firm—Ernest G. Szoke; Henry E. Millson, Jr.

[57] ABSTRACT

The invention relates to a new primer for pretreating glass in readiness for waterproof bonding to other substrates. The primer contains resins, functional silanes, solvents, and organosilazanes and, if desired, polyfunctional isocyanates and other additives. Compared with conventional primers, the resistance of the bond to hydrolysis is significantly improved.

17 Claims, No Drawings

GLASS PRIMER

This application is a division of application Ser. No. 689,619, filed Jan. 8, 1986, now U.S. Pat. No. 4,670,057.

BACKGROUND OF THE INVENTION

1. Field of the Invention

This invention relates to a primer for the pretreatment of glass surfaces which are to be bonded by standard adhesives to rigid or flexible substrates.

2. Description of Related Art

Glass is a difficult substrate to bond because direct bonding does not produce bonds which satisfy stringent requirements with respect to mechanical strength and durability. Numerous efforts have been made to develop suitable primers. Thus, a primer based on a resin and a silane, such as for example N-2-aminoethyl-2-aminopropyl trimethoxysilane, is proposed for example in U.S. Published patent application No. B 417,014. Although primers such as these provide for bonds which are sufficiently resistant to water and hydrolysis for certain applications, there is nevertheless a need to increase the resistance of glass bonds to water. Thus, waterproof elastomer-glass bonds are for example of interest in the automotive industry.

DESCRIPTION OF THE INVENTION

Accordingly, an object of the present invention is to provide a primer, i.e. a pretreatment agent, for glass by which it is possible to establish hydrolysis-resistant bonds between glass and flexible or rigid substrates, for example elastomers or metals, using known adhesives.

Accordingly, the present invention relates to a primer for the pretreatment of glass in readiness for waterproof bonding, wherein the primer comprises:

A. from about 2 to about 10, preferably from about 3 to about 7% by weight of at least one resin,
B. from about 2.5 to about 25, preferably from about 5 to about 15% by weight of at least one functional silane,
C. from about 0.5 to about 5, preferably from about 1 to about 2% by weight of at least one organosilazane,
D. from about 70 to about 95, preferably from about 80 to about 90% by weight of an organic solvent, and
E. from 0 to about 10, preferably from about 1 to about 6% by weight of one or more of a polyfunctional isocyanate, a prepolymer of a polyhydric alcohol and a molar excess of an aliphatic or aromatic diisocyanate, and an adduct of a polyfunctional epoxide and an aliphatic or aromatic diisocyanate.

The present invention also relates to the use of the above glass primers.

As stated above, the glass primers of the invention contain a resin component, component A. Preferred resins are phenolic resins, particularly reactive phenolic resins. Reactive phenolic resins are understood to be phenolic resins which are not completely crosslinked, i.e. which do not have a three-dimensional lattice-like molecular structure. Reactive phenolic resins such as these are, for example, acid-condensed phenol-formaldehyde or resorcinol-formaldehyde resins which are generally referred to as novolacs. However, it is also possible to use base-condensed phenolic resins which still contain hydroxymethyl groups and which are capable of polycondensation on heating. Thus, it is possible to use phenolic resins in the narrower sense, resorcinol-formaldehyde resins or coumarone-indene resins. In addition to the above resin components, it is also possible to use modified resins, for example, terpene-modified phenolic resins or mixtures thereof with hydrogenated rosin resins. A review of such phenolic resins useful herein can be found in Houben-Weyl, Makromolekulare Stoffe, Part 2 (Vol. 14), Georg Thieme Verlag, Stuttgart, 1963, pages 197 et seq. which is expressly incorporated herein by reference.

In one particularly preferred embodiment of the invention, both novolacs and also resol resins, for example mixtures of novolac and tertiary butyl phenol resol resin, are used herein as component A.

For use in the primers of the invention, it is also preferred to select phenolic resins as component A. which have a viscosity at 25° C. of from about 1000 to about 5000 mPas and an OH-number of from about 300 to about 500. Known products of this type are based on phenol, cresols, tert.-butyl phenol, amyl phenol, resorcinol, or bisphenol A.

The silanes used in the primers of the invention as component B. are known compounds which are generally recommended as so-called adhesion promoters by commercial manufacturers. According to the invention, it is preferred to use products containing at least one reactive group, such as for example vinyl triethoxy silane, vinyl trimethoxy silane, vinyl-tris-(β-methoxyethoxy)silane, γ-methacryloxypropyl trimethoxysilane, γ-methacryloxypropyl-tris-(2-methoxyethoxy)-silane, γ-mercaptopropyl-trimethoxysilane, γ-aminopropyl-triethoxysilane or the adduct of acrylic acid with that compound.

The following silanes can also be used: γ-chloropropyltrimethoxysilane, γ-glycidyloxypropyltrimethoxysilane, vinyltriacetoxysilane, β-(3,4-epoxycyclohexyl)ethyltrimethoxysilane and also N-β-(aminoethyl)-γ-amino-propyltrimethoxysilane or its methacrylic acid adduct in methanol solution.

As stated above, the primers of the invention contain organosilazanes as component C. Organosilazanes are reaction products of organohalogen silanes with ammonia or amines. The reaction products with ammonia are preferred for the purposes of the present invention. Products such as these are not new and their production is described, for example, in German Application No. 28 34 027, which is expressly incorporated herein by reference. By virtue of their Si—N—bonds, organosilazanes are basically hydrolysis-sensitive compounds. These products have hitherto been used as mold release agents in the rubber industry. It is therefore all the more astonishing to those skilled in the art that organosilazanes have now been found to be capable of improving the hydrolysis resistance of glass bonds and, more particularly, the hydrolysis resistance of bonds between glass and elastomers.

The organosilazanes used in accordance with the invention can be produced by the process described in German Application No. 28 34 027, in which solutions of the corresponding organohalogen silanes in inert solvents are reacted with liquid ammonia under pressure and at temperatures in the range of from about 0° to about 50° C.

Suitable organohalogen silanes which can be further processed by this method to form the organosilazanes used in accordance with the invention are diorganodihalogen silanes and/or organotrihalogen silanes or, more precisely, triorganohalogensilanes. The chlorine compounds are preferably used as starting materials, although the bromine compounds can also be used.

The organosilazanes thus produced and used in accordance with the invention contain organic groups which are directly attached to silicon. These organic groups can be alkyl or aryl groups. According to the invention, it is possible to use organosilazanes which contain identical or different carbon residues on the silicon atom.

Suitable Si-bound aromatic radicals are phenyl groups or $C_1$-$C_6$ alkyl substituted phenyl groups while suitable aliphatic radicals preferably contain from 1 to 7 carbon atoms; thus, methyl, ethyl, propyl, isopropyl, butyl, pentyl, neopentyl, hexyl, cyclohexyl or benzyl groups can be attached to the silicon. The latter groups can in turn contain further functional groups providing those groups do not react with the Si—N—bond. Suitable functional groups are, for example, amino or mercapto groups. It is also possible to produce and use organosilazanes containing olefinic double bonds, for example vinyl or allyl groups.

Preferred organosilazanes are the reaction products of methyl trichlorosilane and/or dimethyl dichlorosilane with an excess of ammonia according to German Applcation No. 28 34 027, and also the corresponding propyl compounds.

The organic solvent that is employed herein as component D. can be a single liquid organic solvent or a mixture of two or more such liquid solvents. Such solvents include ketones, esters, aromatic hydrocarbons, aliphatic hydrocarbons and halogenated hydrocarbons. Particularly preferred solvents are methylethyl ketone, alcohol/ketone mixtures, methylene chloride and mixtures thereof with ethylglycol acetate.

As optional component E., the glass primers of the invention can contain a polyfunctional isocyanate. Although not essential, the use of polyfunctional isocyanates is advisable, for example when glass is to be bonded to metals. Suitable polyfunctional isocyanates are primarily diisocyanates, for example aromatic diisocyanates, such as tolylene diisocyanate, xylylene diisocyanate, diphenylmethane diisocyanate or technical (more higly condensed) diphenylmethane diisocyanate (functionality of the order of 2.3). Aliphatic diisocyanates, such as isophorone diisocyanate, are also suitable. In addition, prepolymers can be used instead of the diisocyanates. Suitable prepolymers are prepolymers of polyhydric alcohols, particularly diols and triols, such as ethylene glycol, propylene glycol, condensed ethylene and propylene glycols, glycerol, trimethylol ethane, trimethylol propane and/or pentaerythritol, with a distinct excess (more than 20 mole % excess) of the above-mentioned aliphatic and/or aromatic diisocyanates. Prepolymers such as these are used in many industrial fields and are well known to those skilled in the art in adhesives. They can be obtained as such or can be prepared by mixing the raw materials in the appropriate ratio, addition of the hydroxy compound to the diisocyanate being the preferred method of preparation.

Instead of using adducts of diisocyanates with polyhydric alcohols (polyurethane prepolymers), adducts of the above-mentioned aromatic or aliphatic diisocyanates with polyfunctional epoxides can be used. Thus, the reaction product of triglycidyl isocyanurate with diphenylmethane diisocyanate in a molar ratio of 1:3 or the reaction product of the diglycidyl ether of bisphenol A with diphenylmethane diisocyanate in a molar ratio of 1:2 is a suitable additive.

The primers of the invention are easy to use. The solutions are applied to cleaned glass surfaces in the usual way, i.e. by means of spray guns, brushes or coating knives. The solvent is then evaporated and the second substrate applied using a suitable binder.

The glass primers of the invention are particularly suitable when polar and apolar elastomers are to be vulcanized onto glass under vulcanization conditions using standard vulcanization adhesives. Suitable vulcanization adhesives are described, for example, in German Patent Application No. 30 41 841.8. In addition, bonds such as these can also be produced using other standard vulcanization adhesives. The usefulness of the primers of the invention is not confined to vulcanization adhesives. Thus, favorable results are also obtained in cases where glass is to be bonded to other substrates using polyurethane adhesives. This applies in particular to glass-metal bonds, in which case it is preferred to add a polyurethane prepolymer to the primer.

The primers are also useful in cases where they are to be bonded using one- or two-component epoxy adhesives or commercially available acrylate adhesives.

In all the cases mentioned, the particular advantage of the binders of the invention lies in a further increase in the resistance of the bonds to hydrolysis. In this connection, the primers have proved to be particularly suitable for bonds which are exposed to weathering for prolonged periods at highly fluctuating temperatures. Thus, the bonds made using the primers satisfy the requirements of the automotive industry.

The invention will be illustrated but not limited by the following examples.

EXAMPLES

Examples 1-6

Various mixtures were prepared, their compositions being shown in the following Table:

TABLE I

| Primer composition | % by weight EXAMPLE | | | | | |
|---|---|---|---|---|---|---|
| | 1 | 2 | 3 | 4 | 5 | 6 |
| γ-Aminopropyltriethoxy silane | 6 | — | — | — | 8 | — |
| Vinyl triethoxysilane | 6 | — | 5 | 5 | — | 4 |
| γ-Mercaptopropyltrimethoxy silane | 5 | — | — | 5 | 2 | 6 |
| γ-Mercaptopropyltrimethoxy silane/MDI-adduct[1] | — | 15 | 10 | — | — | — |
| Novolac-A | — | — | — | 5 | 3 | — |
| t-Butylphenol resin (resol) M.p. = 80-90 | — | — | — | — | 4 | — |
| Polymethylsilazane[2] | — | — | — | 2 | 1 | — |
| Triglycidylisocyanurate/ MDI-adduct[1] | — | — | 5 | — | — | 6 |
| Solvent | | | | | | |
| methylethyl ketone | 48 | 49 | 46 | 47 | 47 | 49 |
| methylene chloride | 35 | 36 | 34 | 36 | 35 | 35 |

[1]MDI = diphenylmethane diisocyanate
[2]Polymethylsilazane prepared according to German Application No. 28 34 027

The above primer compositions were applied as primer to clean glass surfaces by means of spray guns or brushes. After drying of the primer coat, the surfaces were coated with a standard binder from the Chemosil ® range (binders produced by Henkel KGaA for vulcanizing rubber onto stable substrates). In the present case, Chemosil ®X 4100 was used.

After the film of Chemosil ® binder had dried, an EPDM (poly-(ethylene-propylene-diene)) film was extruded onto the coated glass surfaces. Thereafter, the EPDM extrudate was vulcanized for 15 minutes at 170° C. in a hot air cabinet.

Examples 4 and 5 are primers according to the invention and Examples 1–3 and 6 are comparison examples.

The following composition was used as the EPDM mixture.

| | |
|---|---|
| Keltan 812 (EPDM) | 100 parts by weight |
| ZnO | 5 parts by weight |
| Stearic acid | 2 parts by weight |
| Carbon black FEF | 90 parts by weight |
| Sillitin N (silica) | 55 parts by weight |
| Sunpar 2280 (mineral oil) | 70 parts by weight |
| CaO (surface-treated with fatty acid) | 6 parts by weight |
| Vaseline (petroleum jelly) | 5 parts by weight |
| Royalac 133 (a dithiocarbamate/thiazole mixture) | 1 parts by weight |
| Vulkacit Mercapto (mercaptobenzthiazole) | 1.25 parts by weight |
| DPTT (dipentamethylene thiuram tetrasulfide) | 1 parts by weight |
| P extra N (zinc ethylphenyldithiocarbamate) | 1.9 parts by weight |
| Sulfasan R (dithiodimorpholine) | 1 parts by weight |
| Sulfur | 0.5 parts by weight |

The bonded substrates were adhesion-tested by peeling off the rubber layer. In addition, the substrates were stored in water heated to 90° C. for 20 hours and for 40 hours and then adhesion-tested. Adhesion was assessed by determining the tearing pattern in accordance with the following scheme:

100 R = 100% of the bond area, tearing of the rubber.
100 G = 100% of the bonded substrates, separation of the primer from the glass surface.

Results are set forth in Table II below.

TABLE II

| Primer | Adhesion | After storage in water at 90° C. for 10 hours | for 20 hours |
|---|---|---|---|
| 1 | 80 R | 60 R–40 G | 20 R–80 G |
| 2 | 100 R | 50 R–50 G | 20 R–80 G |
| 3 | 100 R | 70 R–20 G | 50 R–50 G |
| 4 | 100 R | 100 R | 80 R–20 G |
| 5 | 100 R | 100 R | 100 R |
| 6 | 100 R | 80 R–20 G | 80 R–20 G |

Examples 7–9

Through additions of polyurethane prepolymers of castor oil/MDI[(1)] and PPG[(2)]-adduct (NCO:OH=1:2) containing terminal OH groups, the resulting primers can be used with PU-adhesives for bonding metals. To this end, the mixtures identified in the following Table III were prepared and, as in Examples 1–6, applied to clean glass surfaces. After drying of the primer coat, the substrates were coated with a commercially available PU-adhesive and, after drying, were bonded to steel. The bonds were press-cured for 30 minutes at 160° C.

[(1)]MDI = diphenylmethane diisocyanate
[(2)]PPG = polypropylene glycol

The primer compositions are set forth in Table III below.

TABLE III

| Primer composition | % by weight EXAMPLE | |
|---|---|---|
| | 7 | 8 |
| γ-Aminopropylene triethoxysilane | 8 | 8 |
| γ-Mercaptopropyltrimethoxysilane | 2 | 2 |
| Novolac-A | 3 | 3 |
| t-butylphenol resin (resol) M.p. = 80–90 | 4 | 4 |
| Polymethyl silazane | — | 1 |
| PU-prepolymer (castor oil/MDI-PPG-adduct) | 1 | 1 |
| Solvent | | |
| methylethyl ketone | 47 | 46 |
| methylene chloride | 35 | 35 |

The test specimens were adhesion-tested in a tension machine. The results of the adhesion tests are shown in Table IV below. In addition, the test specimens were stored in boiling water and then adhesion-tested in the tension machine.

TABLE IV

| Primer | $N/mm^2$ | Adhesion | After storage for 5 hours in water at 90° C. | |
|---|---|---|---|---|
| | | | $N/mm^2$ | Adhesion |
| 0-value | 8 | 100 G | 1.5 | 100 G |
| 5 | 25 | glass failure | 18 | glass failure |
| 7 | 22 | glass failure | 20 | glass failure |
| 8 | 25 | glass failure | 20 | glass failure |

Tests were carried out as set forth above except that an acrylate adhesive was used, i.e. the tests were carried out with a polyacrylate adhesive[(x)] instead of a PU-adhesive. After drying of the primer coat, the substrates were coated with a commercially available acrylate adhesive and bonded to steel. The resin of the adhesive was applied to the glass side and the hardener to the metal side.

[(x)]Polyacrylate adhesive: commercially available 2-component, no-mix second-generation acrylate adhesive (Pattex ® No-mix).

The results are shown in the following Table V below.

TABLE V

| Primer | $N/mm^2$ | Adhesion | After storage for 5 hours in water at 90° C. | |
|---|---|---|---|---|
| | | | $N/mm^2$ | Adhesion |
| 0-value | 2 | 100 G | — | 100 G |
| 5 | 11 | 100 G | 4 | 100 G |
| 7 | 8 | 100 G | 3 | 100 G |
| 8 | 12 | 70 G | 6 | 100 G |

What is claimed is:

1. A process for treating a glass surface before bonding to a substrate to improve the bonding characteristics of the surface and promote a hydrolysis-resistant bond comprising applying to said surface a primer composition consisting essentially of:
   A. from about 2 to about 10% by weight of at least one phenolic or hydrogenated rosin resin;
   B. from about 2.5 to about 25% by weight of at least one functional silane;
   C. from about 0.5 to about 5% by weight of at least one organosilazane obtained by reaction of ammonia or an amine with an organohalogen silane which is a disorganodihalogen silane or a triorganohalogen silane, said organo group being an alkyl or aryl group;

D. from about 70 to about 95% by weight of an organic solvent; and

E. from 0 to about 10% by weight of one or more of (a) a polyfunctional isocyanate, (b) a prepolymer of a polyhydric alcohol and a molar excess of an aliphatic or aromatic diisocyanate, and (c) an adduct of a polyfunctional epoxide and an aliphatic or aromatic diisocyanate.

2. The process of claim 1 wherein the quantities of components present is as follows:

Component A., from about 3 to about 7% by weight;
Component B., from about 5 to about 15% by weight;
Component C., from about 1 to about 2% by weight;
Component D., from about 80 to about 90% by weight; and
Component E., from about 1 to about 6% by weight of one or more of a polyfunctional isocyanate, a prepolymer of a polyhydric alcohol and a molar excess of an aliphatic or aromatic diisocyanate, and an adduct of a polyfunctional epoxide and an aliphatic or aromatic diisocyanate.

3. The process of claim 1, wherein component C is the reaction product of an organohalogen silane with ammonia.

4. The process of claim 3, wherein said organohalogen silane is a dialkyldichlorosilane, an alkyl trichlorosilane, an aryl trichlorosilane, a diaryl trichlorosilane; an aralkyl trichlorosilane, or a diaralkyl trichlorosilane.

5. The process of claim 4, wherein the organohalogen silane is a dialkyldichlorosilane wherein the alkyl groups each contains from 1 to 7 carbon atoms.

6. The process of claim 5, wherein the alkyl groups each contains from 1 to 3 carbon atoms.

7. The process of claim 4, wherein the organohalogen silane is an alkyl trichlorosilane wherein the alkyl group contains from 1 to 7 carbon atoms.

8. The process of claim 7, wherein the alkyl group contains from 1 to 3 carbon atoms.

9. The process of claim 1, wherein a polyfunctional isocyanate is present in the composition and is an aliphatic diisocyanate, an aromatic diisocyanate, or a reaction product thereof with a substoichiometric quantity of an alcohol having from 2 to 4 hydroxy groups.

10. The process of claim 1, wherein component A. is a terpene-modified phenolic resin, a novalac, a resorcinol-formaldehyde resin, a hydrogenated rosin resin, or a coumarone-indene resin.

11. The process of claim 1, wherein the functional silane in component B. is an aminoalkyl trialkoxy silane, a vinyl trialkoxy silane, a mercaptoalkyl trialkoxy silane, or an adduct of a mercaptoalkyl trialkoxy silane with a diisocyanate.

12. The process of claim 1, wherein the resin is a phenolic resin.

13. The process of claim 12 wherein the resin is a reactive phenolic resin.

14. The process of claim 1, wherein the substrate to be bonded to the glass surface is a polar or apolar elastomer.

15. The process of claim 1, wherein the application of the primer composition is followed by the application of a vulcanization adhesive, or a polyurethane, epoxy, or acrylate adhesive, prior to bonding said substrate.

16. The process of claim 1, wherein the substrate to be bonded to the glass surface is a metal.

17. The process of claim 16, wherein the primer composition includes a prepolymer of a polyhydric alcohol and a molar excess of an aliphatic or aromatic diisocyanate.

* * * * *